W. DICKERSON & H. O. WILBUR.
Stump Extractor.
No. 53,125. Patented March 13, 1866.
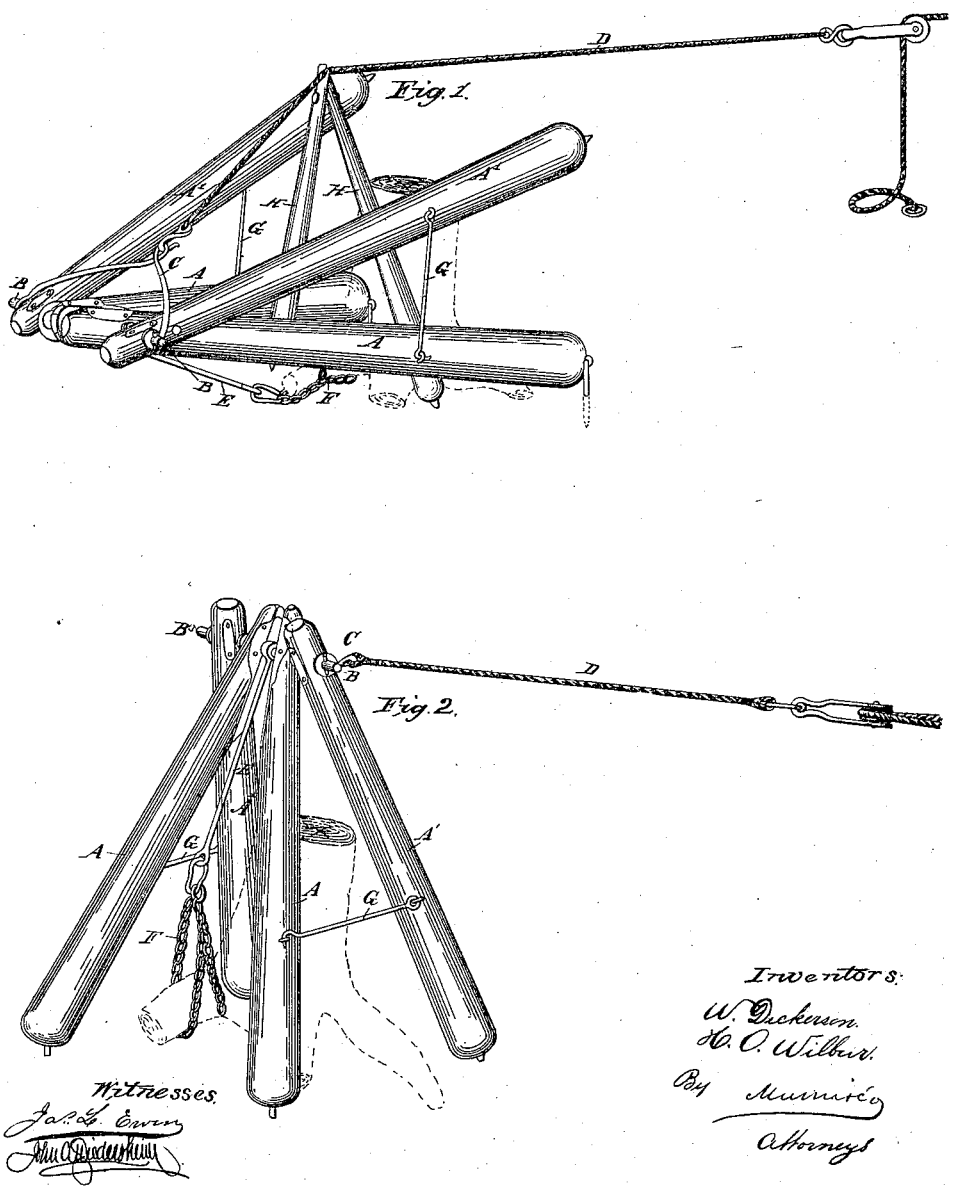

UNITED STATES PATENT OFFICE.

WILLIAM DICKERSON AND HENRY O. WILBUR, OF RIDGEBURY, PA.

IMPROVEMENT IN STUMP-EXTRACTORS.

Specification forming part of Letters Patent No. 53,125, dated March 13, 1866.

*To all whom it may concern:*

Be it known that we, WILLIAM DICKERSON and HENRY O. WILBUR, both of Ridgebury, in the county of Bradford and State of Pennsylvania, have invented a new and useful Improvement in Stump-Extractors; and we do hereby declare the following to be a full, clear, and exact description of the nature, construction, and operation of the same, reference being had to the accompanying drawings, which are made a part of this specification, in which—

Figure 1 is a perspective view of our improved stump-extractor, the parts being shown in the position which they occupy at the commencement of the operation of extracting a stump. Fig. 2 is a similar view, showing the parts in the position they occupy when the operation is half completed.

Similar letters of reference indicate corresponding parts in the two figures.

The subject of our invention is a device which admits of the application of great power in extracting stumps, and which provides means whereby the extracting power is maintained till the operation is fully completed.

To enable others skilled in the art to which our invention appertains to fully understand and use the same, we will proceed to describe its construction and operation in detail in connection with the accompanying drawings.

A stump is delineated in red in both figures, and the devices will be described in connection with the operation of pulling the same.

A A A' A' represent two pairs of levers, all of which are connected together by a rod, B, which passes through one end of each lever.

C is a bail-shaped rod attached to the respective ends of the rod B, so as to turn loosely thereon, and having a loop at the middle for the attachment of the draft-rope D, to which a team is hitched.

E is a link or connecting-piece, which is attached to the center of the rod B, and serves for the attachment of a chain or rope, F, which is hitched under one of the roots of the stump, as clearly represented in Fig. 2.

When everything is ready for the operation the levers A are connected, near their loose ends, to the corresponding ends of the levers A' by the stiff links G G, when the levers will be held off from each other, as represented. A double prop or support, H H, is then placed outside the stump, as shown in Fig. 1, the levers A being placed on the ground at opposite sides of the stump. The team is now started, or the power applied in any suitable way, and the levers A commence to act, said levers rising up at one end and bearing firmly against the earth at their lower ends. By this movement of the levers A the power applied through the link E and chain F loosens or uproots the stump at one side, but they cease to act after they have reached an upright position, for the reason that their acting ends no longer move away from the point of action. At this stage of the operation the levers A' come into operation and complete the work. Their lower ends come in contact with the ground at a suitable point to enable them to act on the stump, they being held in proper position to effect this object by the links G.

The function of the prop or support H H is to enable an upward draft to be applied to the acting ends of the levers A, so as to raise the same off the ground. As soon as they are no longer of service during the operation they may be removed.

It will be observed that by the arrangement shown great initial force is secured to start the stump at the commencement of the operation, which is due to the fact of having the team or other power, together with the fulcrum ends of the levers A, at one side of the stump, while the acting ends of the levers and the point to be acted upon are at the opposite side of said stump.

The lower or fulcrum ends of the levers may be pointed to adapt them to take to the ground, but this is not deemed requisite.

Having thus described our invention, the following is what we claim as new and desire to secure by Letters Patent:

1. The combination of the levers A A and A' A', substantially as described, whereby the operation of pulling the stump is commenced and continued to a certain extent by the one pair A, and then transferred to and completed by the other pair A', as and for the purpose explained.

2. The combination of the two pairs of levers A A A' A', the prop or support H H, draft-rope D, links G G, and the attaching devices C E F, the whole being constructed and arranged to operate substantially as described.

The above specification signed and witnessed this 4th day of December, A. D. 1865.

WILLIAM DICKERSON.
HENRY O. WILBUR.

Witnesses:
NEWTON P. FASSETT,
WM. J. MOULTON.